(12) United States Patent
Zou (10) Patent No.: US 10,839,736 B2
(45) Date of Patent: Nov. 17, 2020

(54) IMAGE DISPLAY METHOD AND IMAGE DISPLAY DEVICE (71) Applicant: BOE Technology Group Co., Ltd., Beijing (CN)

(72) Inventor: Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/138,601

(22) Filed: Sep. 21, 2018

(65) Prior Publication Data
US 2019/0221150 A1 Jul. 18, 2019

(30) Foreign Application Priority Data

Sep. 25, 2017 (CN) .......................... 2017 1 0873216
Sep. 11, 2018 (CN) .......................... 2018 1 1056741

(51) Int. Cl.
G06T 15/00 (2011.01)
G09G 3/20 (2006.01)
G06F 3/147 (2006.01)
G09G 3/3233 (2016.01)
G09G 3/3208 (2016.01)

(52) U.S. Cl.
CPC .......... G09G 3/2007 (2013.01); G06F 3/147 (2013.01); G09G 3/20 (2013.01); G09G 3/3233 (2013.01); G09G 3/3208 (2013.01); G09G 2320/0271 (2013.01); G09G 2320/068 (2013.01); G09G 2340/14 (2013.01); G09G 2354/00 (2013.01); G09G 2360/144 (2013.01)

(58) Field of Classification Search
CPC ........ G06F 3/147; G09G 3/20; G09G 3/2007; G09G 3/3208; G09G 3/3233; G09G 2320/0271; G09G 2320/068; G09G 2340/14; G09G 2354/00; G09G 2360/144
USPC .......................................................... 345/418
See application file for complete search history.

(56) References Cited

U.S. PATENT DOCUMENTS 8,854,802 B2 * 10/2014 Robinson .............. G06F 1/1637
349/74
9,733,881 B2 * 8/2017 Rakshit ................. G06F 3/1423
2012/0102438 A1 * 4/2012 Robinson ................ G06F 3/011
715/863

(Continued)

OTHER PUBLICATIONS

Sharma, A. (2014). Augmented tools with transparent displays (Doctoral dissertation, Massachusetts Institute of Technology).*

(Continued)

Primary Examiner — Phu K Nguyen
(74) Attorney, Agent, or Firm — Westman, Champlin & Koehler, P.A.

(57) ABSTRACT

An image display method and an image display device are provided. The image display method includes: acquiring an environmental image in a backlight direction of a display panel; determining a viewing position of a user, and determining a background image capable of being viewed by the user through the display panel from the environmental image; determining an image compensation parameter of the display panel in accordance with an image parameter of the background image; and controlling the display panel to compensate for a to-be-displayed image in accordance with the image compensation parameter.

13 Claims, 7 Drawing Sheets

(56) References Cited

U.S. PATENT DOCUMENTS

| | | | | |
|---|---|---|---|---|
| 2014/0085334 | A1* | 3/2014 | Payne | H04M 3/42382 345/633 |
| 2017/0046871 | A1* | 2/2017 | McCarthy | G06T 15/20 |

OTHER PUBLICATIONS

Park et al, Three-dimensional Transparent Display with Enhanced Transmittance and Resolution Using an Active Parallax Barrier with See-through Areas on an LCD Panel, Department of Physics, Sejong University, Apr. 2017.*

Bimber O., Raskar R. Spatial augmented reality: merging real and virtual worlds. AK Peters/CRC Press; Aug. 8, 2005.*

Li J, Greenberg S, Sharlin E, Jorge J. Interactive two-sided transparent displays: designing for collaboration. InProceedings of the 2014 conference on Designing interactive systems Jun. 21, 2014 (pp. 395-404). ACM.*

Lindlbauer D, Lilija K, Walter R, Müller J. Influence of display transparency on background awareness and task performance. InProceedings of the 2016 CHI Conference on Human Factors in Computing Systems May 7, 2016 (pp. 1705-1716). ACM.*

Lindlbauer, D., Mueller, J. and Alexa, M., Oct. 2016. Changing the appearance of physical interfaces through controlled transparency. In Proceedings of the 29th Annual Symposium on User Interface Software and Technology (pp. 425-435). ACM.*

Kim H, Huh BK, Im SH, Joung HY, Kwon GH, Park JH. Finding Satisfactory Transparency: An Empirical Study on Public Transparent Displays in a Shop Context. InProceedings of the 33rd Annual ACM Conference Extended Abstracts on Human Factors in Computing Systems Apr. 18, 2015 (pp. 1151-1156). ACM.*

Li, J. (2015). Two-sided transparent display as a collaborative medium (Doctoral dissertation, University of Calgary).*

Kim, Heesun, Seung A. Lee, Hyoyoung Kim, and Ji-Hyung Park. "Twosome Coloring: Designing a Playful Coloring System on Dual-sided Transparent Surfaces." In Proceedings of the 2016 ACM International Conference on Interactive Surfaces and Spaces, pp. 373-378. ACM, 2016.*

Rafael, Rybczynski. "Designing transparent display experience through the use of kinetic interaction." (2017).*

Smolic, A., Mueller, K., Merkle, P., Fehn, C., Kauff, P., Eisert, P. and Wiegand, T., Jul. 2006. 3D video and free viewpoint video-technologies, applications and MPEG standards. In 2006 IEEE International Conference on Multimedia and Expo (pp. 2161-2164). IEEE.*

Würmlin S, Lamboray E, Gross M. 3D video fragments: Dynamic point samples for real-time free-viewpoint video. Computers & Graphics. Feb. 1, 2004;28(1):3-14.*

Pulli K, Hoppe H, Cohen M, Shapiro L, Duchamp T, Stuetzle W. View-based rendering: Visualizing real objects from scanned range and color data. InRendering techniques' 97 1997 (pp. 23-34). Springer, Vienna.*

* cited by examiner

IMAGE DISPLAY METHOD AND IMAGE DISPLAY DEVICE

CROSS-REFERENCE TO RELATED APPLICATION

The present application claims priorities of the Chinese patent applications No. 201710873216.2 filed on Jan. 18, 2018 and No. 201811056741.6 filed on Sep. 11, 2018, which are incorporated herein by reference in their entireties.

TECHNICAL FIELD

The present disclosure relates to the field of transparent display technology, in particular to an image display method and an image display device.

BACKGROUND

As a bleeding-edge technology for a display product, the transparent display technology refers to the display of content on a transparent display panel, so as to enable a user to view an environment in a backlight direction of a display panel, thereby to meet a viewing requirement in some special scenarios.

A transparent display effect of a conventional transparent display panel is not ideal enough, and a principal problem lies in that the environment behind the display panel may usually interfere with the normal display of the display panel. For example, when there is background region having a high brightness value or a low brightness value behind the display panel, it is impossible for the user to view clearly the content on the display panel corresponding to the background region, so the user experience may be adversely affected.

Hence, there is an urgent need to provide a better transparent display scheme, so as to solve the above-mentioned problem.

SUMMARY

In one aspect, the present disclosure provides in some embodiments an image display method for use in a display panel for transparent display, including: acquiring an environmental image in a backlight direction of the display panel; determining a viewing position of a user, and determining a background image capable of being viewed by the user through the display panel from the environmental image; determining an image compensation parameter of the display panel in accordance with an image parameter of the background image; and controlling the display panel to compensate for a to-be-displayed image in accordance with the image compensation parameter.

In a possible embodiment of the present disclosure, the display panel is of a rectangular shape, and four corners of the display panel correspond to four predetermined collection positions respectively. The acquiring the environmental image in the backlight direction of the display panel includes: photographing an environment in the backlight direction of the display panel at the four predetermined collection positions so as to acquire four images; and combining the four images into the environmental image.

In a possible embodiment of the present disclosure, the combining the four images into the environmental image includes: determining an upper left positioning point, a lower left positioning point, an upper right positioning point and a lower right positioning point; placing the image acquired at a predetermined upper left collection position of the display panel in such a manner that a center of the image coincides with the upper left positioning point; placing the image acquired at a predetermined lower left collection position of the display panel in such a manner that a center of the image coincides with the lower left positioning point; placing the image acquired at a predetermined upper right collection position of the display panel in such a manner that a center of the image coincides with the upper right positioning point; placing the image acquired at a predetermined lower right collection position of the display panel in such a manner that a center of the image coincides with the lower right positioning point; and combining the four images into the environmental image.

In a possible embodiment of the present disclosure, the determining the viewing position of the user and determining the background image capable of being viewed by the user through the display panel from the environmental image includes: positioning the user at each predetermined collection position so as to generate coordinates $(S_i, S_i')$ of the user relative to each of four corners of the display device, where i=1, 2, 3, 4; determining coordinates $(X_i, Y_i)$ of each of the four corners of the background image using the formulae $$Y_i = y_i - \frac{S_1 d_2}{d_1} \text{ and } X_i = x_i - \frac{S_1 d_2}{d_1};$$

and acquiring the background image from the environmental image in accordance with the coordinates $(X_i, Y_i)$ of four corners of the background image, wherein $d_1$ represents a vertical distance between the user and the display panel, $d_2$ represents a vertical distance between the display panel and the environmental image, and $(x_i, y_i)$ represents coordinates of four corners of an orthogonal projection of the display panel onto the environmental image.

In a possible embodiment of the present disclosure, the determining the image compensation parameter of the display panel in accordance with the image parameter of the background image includes: extracting grayscale parameters of the background image; and determining driving current compensation parameters for different regions of the display panel in accordance with the grayscale parameters.

In a possible embodiment of the present disclosure, the controlling the display panel to compensate for the to-be-displayed image in accordance with the image compensation parameter includes compensating for the different regions of the display panel in accordance with the corresponding driving current compensation parameters, so as to increase a driving current for a region of the display panel corresponding to the background image where the grayscale parameter is smaller than a predetermined threshold, and/or reduce a driving current for a region of the display panel corresponding to the background image where the grayscale parameter is greater than the predetermined threshold.

In another aspect, the present disclosure provides in some embodiments an image display method, including: acquiring four images by cameras at four corners of a display panel with each camera facing backward, and determining coordinates of a center of each image; combining the four images into a complete environmental image; rotating each camera at the corner of the display panel in such a manner as to face forward, and acquiring coordinates of a human eye relative to each corner of the display panel in real time; determining a portion of the environmental image capable of being viewed by the human eye through the display panel in accordance with the coordinates of the human eye relative to the four corners of the display panel, and acquiring a background image; extracting grayscale parameters of the background image, and transmitting the grayscale parameters to an external compensation circuit of the display panel; and optimizing, by the external compensation circuit, a transparent display effect of the display panel in such a manner as to increase a driving current for a region of the display panel corresponding to the background image where the grayscale value is relatively low and reduce a driving current for a region of the display panel corresponding to the background image where the grayscale value is relatively high.

In yet another aspect, the present disclosure provides in some embodiments an image display device, including: an acquisition module configured to acquire an environmental image in a backlight direction of the display panel; a determination module configured to determine a viewing position of a user, and determine a background image capable of being viewed by the user through the display panel from the environmental image; a processing module configured to determine an image compensation parameter of the display panel in accordance with an image parameter of the background image; and a compensation module configured to control the display panel to compensate for a to-be-displayed image in accordance with the image compensation parameter.

In a possible embodiment of the present disclosure, the display panel is of a rectangular shape, and four corners of the display panel correspond to four predetermined collection positions respectively. The acquisition module includes: four cameras arranged at the four predetermined collection positions respectively; a photographing control unit configured to photograph an environment in the backlight direction of the display panel through the four cameras, so as to acquire four images; and a combination unit configured to combine the four images into the environmental image.

In a possible embodiment of the present disclosure, the combination unit is further configured to: determine an upper left positioning point, a lower left positioning point, an upper right positioning point and a lower right positioning point; place the image acquired at a predetermined upper left collection position of the display panel in such a manner that a center of the image coincides with the upper left positioning point; place the image acquired at a predetermined lower left collection position of the display panel in such a manner that a center of the image coincides with the lower left positioning point; place the image acquired at a predetermined upper right collection position of the display panel in such a manner that a center of the image coincides with the upper right positioning point; place the image acquired at a predetermined lower right collection position of the display panel in such a manner that a center of the image coincides with the lower right positioning point; and combine the four images into the environmental image.

In a possible embodiment of the present disclosure, the determination module includes: a determination unit configured to position the user at each predetermined collection position so as to generate coordinates (Si, Si') of the user relative to each of four corners of the display device, where i=1, 2, 3, 4; a calculation unit configured to determine coordinates $(X_i, Y_i)$ of each of four corners of the background image using the formulae $$Y_i = y_i - \frac{S_i d_2}{d_1} \text{ and } X_i = x_i - \frac{S_i d_2}{d_1};$$

and an acquisition unit configured to acquire the background image from the environmental image in accordance with the coordinates $(X_i, Y_i)$ of four corners of the background image, wherein $d_1$ represents a vertical distance between the user and the display panel, $d_2$ represents a vertical distance between the display panel and the environmental image, and $(x_i, y_i)$ represents coordinates of four corners of an orthogonal projection of the display panel onto the environmental image.

In a possible embodiment of the present disclosure, the processing module is further configured to extract grayscale parameters of the background image; and determine driving current compensation parameters for different regions of the display panel in accordance with the grayscale parameters.

In a possible embodiment of the present disclosure, the compensation module is further configured to compensate for the different regions of the display panel in accordance with the corresponding driving current compensation parameters, so as to increase a driving current for a region of the display panel corresponding to the background image where the grayscale parameter is smaller than a predetermined threshold, and/or reduce a driving current for a region of the display panel corresponding to the background image where the grayscale parameter is greater than the predetermined threshold.

In still yet another aspect, the present disclosure provides in some embodiments an image display device, including a memory, a processor and a computer program stored in the memory and capable of being executed by the processor. The processor is configured to execute the computer program so as to implement the above-mentioned image display method.

In still yet another aspect, the present disclosure further provides in some embodiments a computer-readable storage medium storing therein a computer program. The computer program is executed by a processor so as to implement the above-mentioned image display method.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

In the following description, specific details of configurations and assemblies are merely provided to facilitate the understanding of the present disclosure. It should be appreciated that, a person skilled in the art may make further modifications and alternations without departing from the spirit of the present disclosure. In addition, for clarification, any known function and structure will not be described hereinafter.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

For a conventional transparent display technology, an environmental image may interfere with the normal display of a display panel, so the user experience may be adversely affected. An object of the present disclosure is to solve the above problem.

Figure 1:
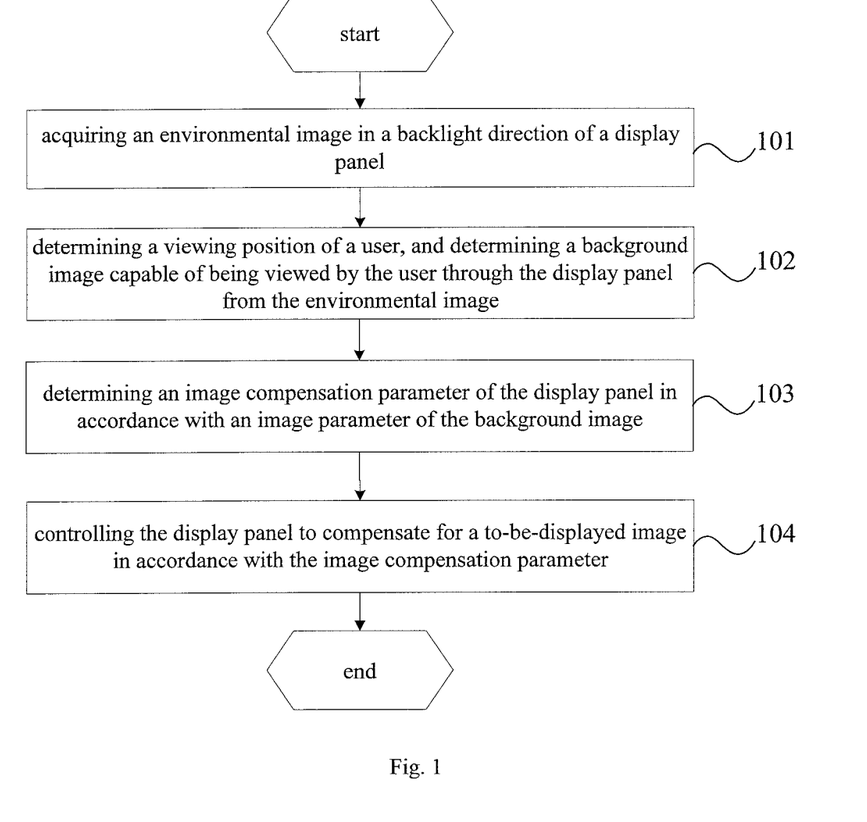
FIG. 1 is a flow chart of an image display method according to one embodiment of the present disclosure.

In one aspect, the present disclosure provides in some embodiments an image display method for use in a display panel for transparent display. As shown in FIG. 1, the image display method includes: Step 101 of acquiring an environmental image in a backlight direction of the display panel; Step 102 of determining a viewing position of a user, and determining a background image capable of being viewed by the user through the display panel from the environmental image; Step 103 of determining an image compensation parameter of the display panel in accordance with an image parameter of the background image; and Step 104 of controlling the display panel to compensate for a to-be-displayed image in accordance with the image compensation parameter.

According to the image display method in the embodiments of the present disclosure, the image to be displayed on the display panel is compensated in accordance with the image parameter of the background image to be displayed. As a result, it is able to optimize the display of the background image, prevent the background image from interfering with an original content to be viewed by the user, and display the background and the original content at a display region in a clear manner, thereby to significantly improve the user experience as well as a transparent display effect.

The image display method will be described hereinafter in more details in conjunction with the embodiments.

Figure 2:
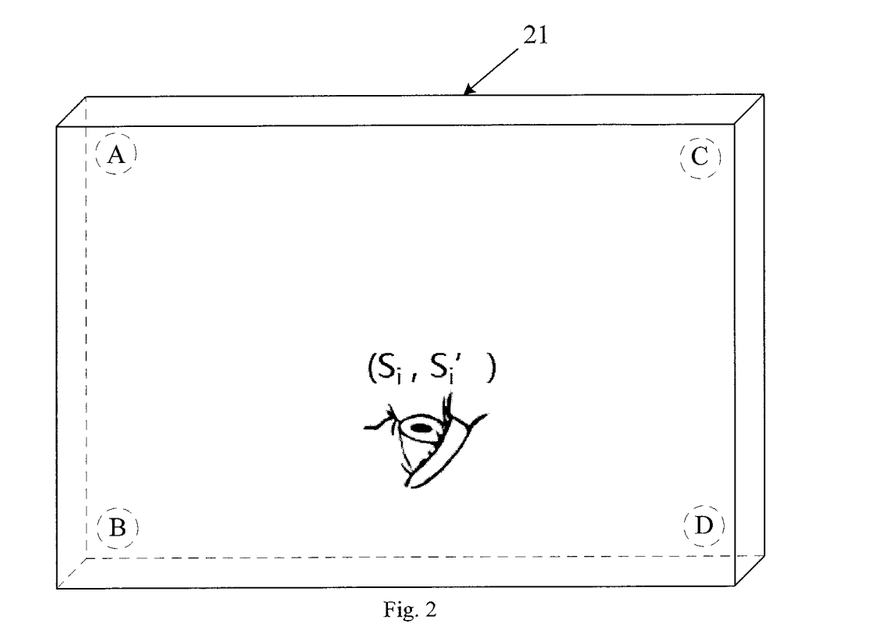
FIG. 2 is a schematic view showing predetermined collection positions on a display panel according to one embodiment of the present disclosure.

As shown in FIG. 2, the display panel 21 may be of a rectangular shape, and four corners of the display panel 21 may correspond to four predetermined collection positions A, B, C and D.

Step 101 may include: Step 1011 of photographing an environment in the backlight direction of the display panel 21 at the four predetermined collection positions A, B, C and D so as to acquire four images; and Step 1012 of combining the four images into the environmental image. Step 1012 may include: Step 10121 of determining an upper left positioning point, a lower left positioning point, an upper right positioning point and a lower right positioning point; Step 10122 of placing the image acquired at a predetermined upper left collection position A of the display panel 21 in such a manner that a center of the image coincides with the upper left positioning point; Step 10123 of placing the image acquired at a predetermined upper right collection position B of the display panel 21 in such a manner that a center of the image coincides with the upper right positioning point; Step 10124 of placing the image acquired at a predetermined lower left collection position C of the display panel 21 in such a manner that a center of the image coincides with the lower left positioning point; Step 10125 of placing the image acquired at a predetermined lower right collection position D of the display panel 21 in such a manner that a center of the image coincides with the lower right positioning point; and Step 10126 of combining the four images into the environmental image.

Steps 10121 to 10126 will be described hereinafter.

Figure 3A:
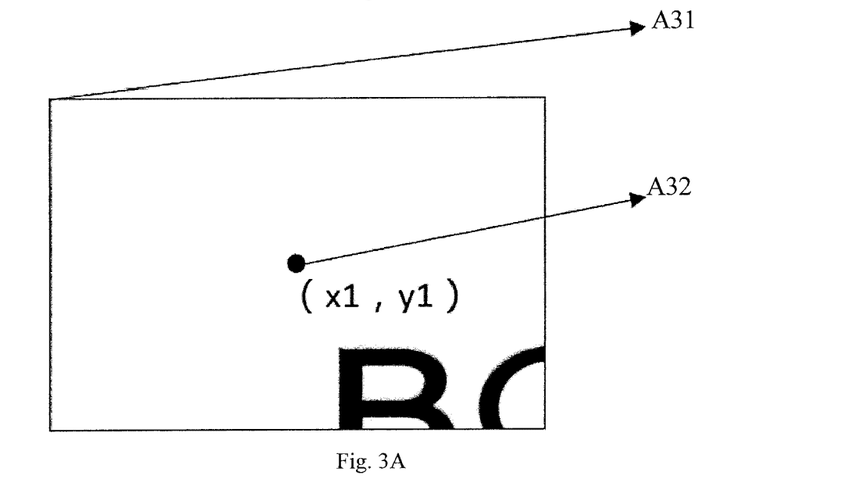
FIGS. 3A-3E are schematic views showing the acquisition of an environmental image through photographing at the predetermined collection positions according to one embodiment of the present disclosure.

As shown in FIG. 3A which is a schematic view showing the image acquired at the upper left predetermined collection position A of the display panel 21, an origin A31 represents an upper left corner of the image, and coordinates of the center A32 of the image are (x1, y1).

Figure 3B:
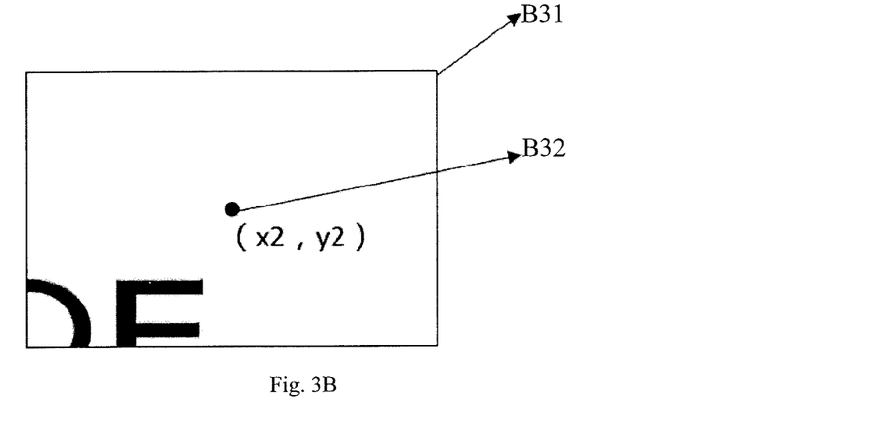

As shown in FIG. 3B which is a schematic view showing the image acquired at the upper right predetermined collection position B of the display panel 21, an origin B31 represents an upper right corner of the image, and coordinates of the center B32 of the image are (x2, y2).

Figure 3C:
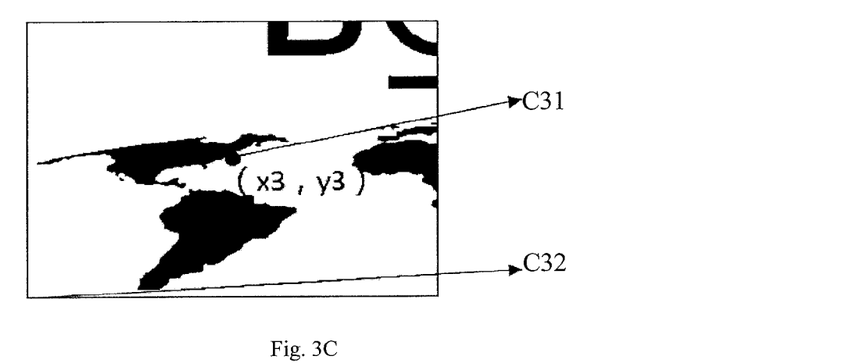

As shown in FIG. 3C which is a schematic view showing the image acquired at the lower left predetermined collection position C of the display panel 21, an origin C31 represents a lower left corner of the image, and coordinates of the center C32 of the image are (x3, y3).

Figure 3D:
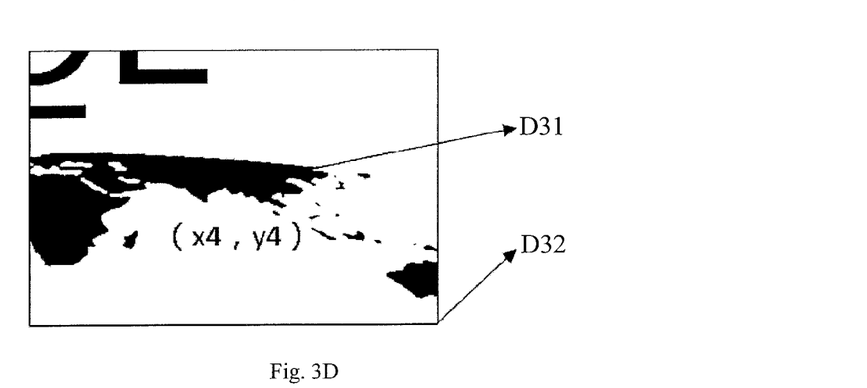

As shown in FIG. 3D which is a schematic view showing the image acquired at the lower right predetermined collection position D of the display panel 21, an origin D31 represents a lower right corner of the image, and coordinates of the center C32 of the image are (x4, y4).

Figure 3E:
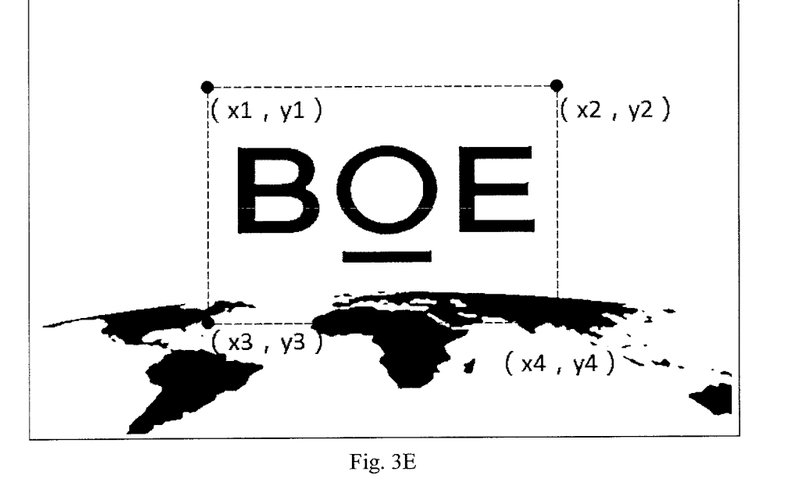

The four images in FIGS. 3A-3D may be combined in such a manner that their centers coincided with the upper left positioning point, the lower left positioning point, the upper right positioning point and the lower right positioning point respectively, so as to acquire the environmental image as shown in FIG. 3E.

Through the above steps, it is able to appropriately combine the images acquired at the four corners of the display panel into the environmental image, with redundant portions in the images being filtered out effectively.

Step 102 may be performed subsequent to the determination of the environmental image in the backlight direction of the display panel.

Figure 4A:
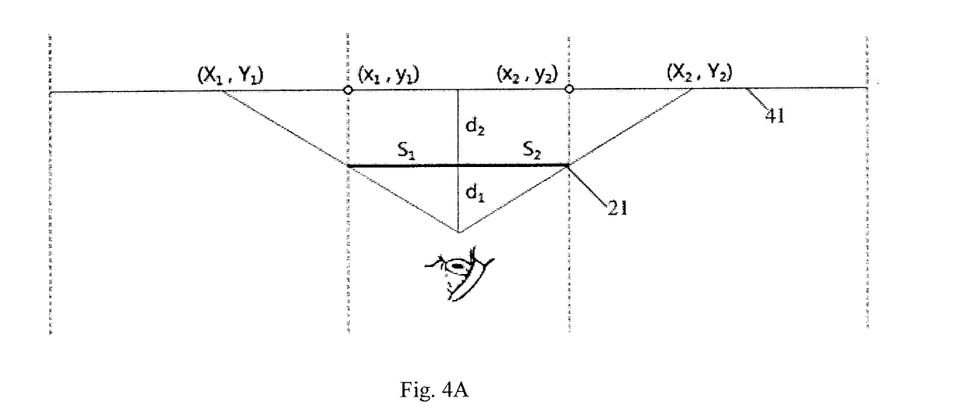
FIGS. 4A-4C are schematic views showing a position relationship among a user, the display panel and the environmental image according to one embodiment of the present disclosure.
Figure 4B:
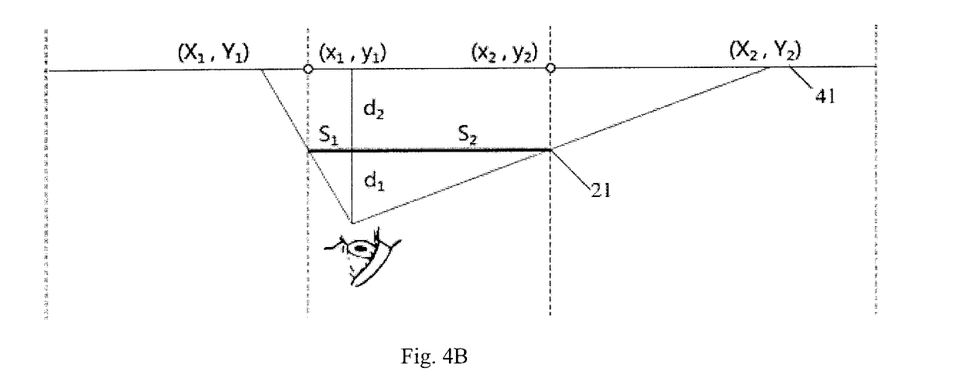
Figure 4C:
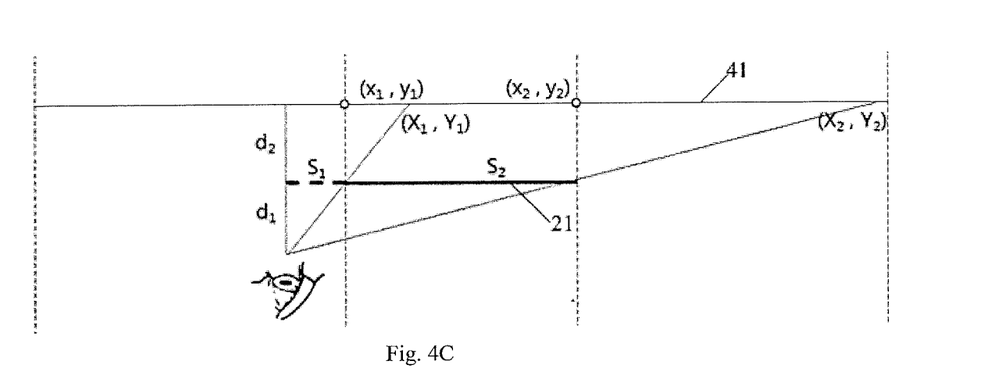

FIGS. 4A to 4C show position relationships between the user at different positions and the display panel 21 as well as the environmental image 41, and in these figures, a human eye represents a viewing position.

Based on the above position relationships in conjunction with a geometric principle, Step 102 may include: Step 1021 of, as shown in FIG. 2, positioning the user at each of predetermined collection positions A, B, C and D so as to generate coordinates (Si, Si') of the user relative to each corner of the display device, where i=1, 2, 3, 4, i.e., four corners of the display panel; Step 1022 of determining coordinates $(X_i, Y_i)$ of each corner of the background image using the formulae $$Y_i = y_i - \frac{S_1 d_2}{d_1} \text{ and } X_i = x_i - \frac{S_1 d_2}{d_1};$$

and Step 1023 of acquiring the background image from the environmental image in accordance with the coordinates $(X_i, Y_i)$ of four corners of the background image, wherein $d_1$ represents a vertical distance between the user and the display panel, $d_2$ represents a vertical distance between the display panel and the environmental image, and $(x_i, y_i)$ represents coordinates of four corners of an orthogonal projection of the display panel onto the environmental image.

Upon the determination of the background image, the image compensation parameter of the display panel 21 maybe determined, and when the background image is displayed by the display panel 21, the compensation may be performed on the display image in accordance with the image compensation parameter.

Illustratively, Step 103 may include: Step 1031 of extracting grayscale parameters of the background image; and Step 1032 of determining grayscale parameters of different regions of the display panel 21 corresponding to the background image 41.

Correspondingly, Step 104 may include Step 1041 of compensating for the different regions of the display panel 21 in accordance with corresponding driving current compensation parameters, so as to increase a driving current for a region of the display panel 21 corresponding to the background image 41 where the grayscale parameter is smaller than a predetermined threshold, and/or reduce a driving current for a region of the display panel 21 corresponding to the background image 41 where the grayscale parameter is greater than the predetermined threshold.

According to the image display method in the embodiments of the present disclosure, a low-grayscale region and a high-grayscale region of the display panel corresponding to the background image may be determined, and a display effect may be optimized by increasing the driving current for the low-grayscale region and reducing the driving current for the high-grayscale region. As a result, it is able to display both the background image and the original content to be displayed by the display panel in a clear manner, thereby to improve the user experience.

Figure 5:
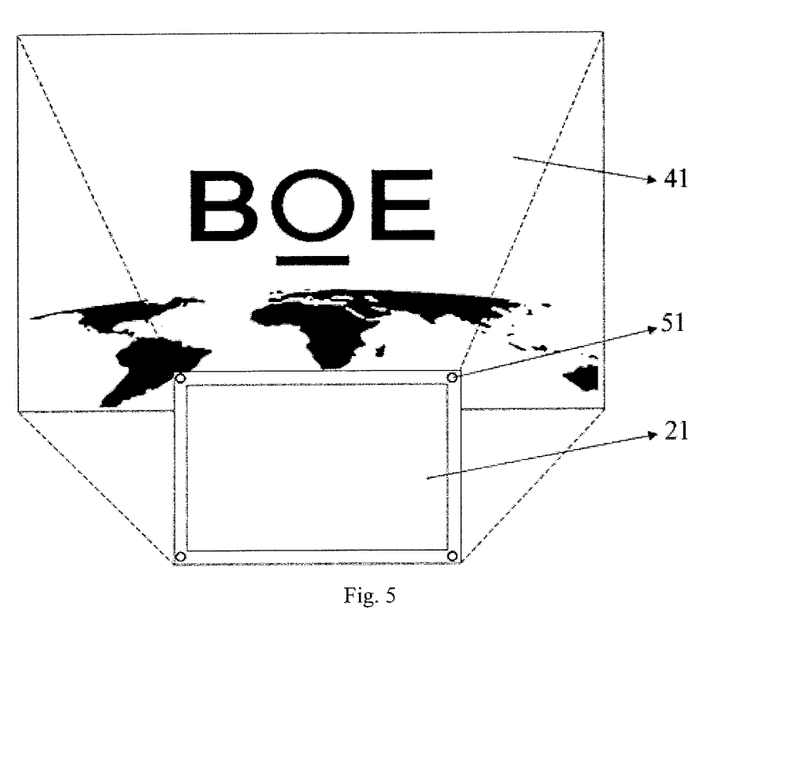
FIG. 5 is a schematic view showing a position relationship between the display panel and the environmental image according to one embodiment of the present disclosure.
Figure 6:
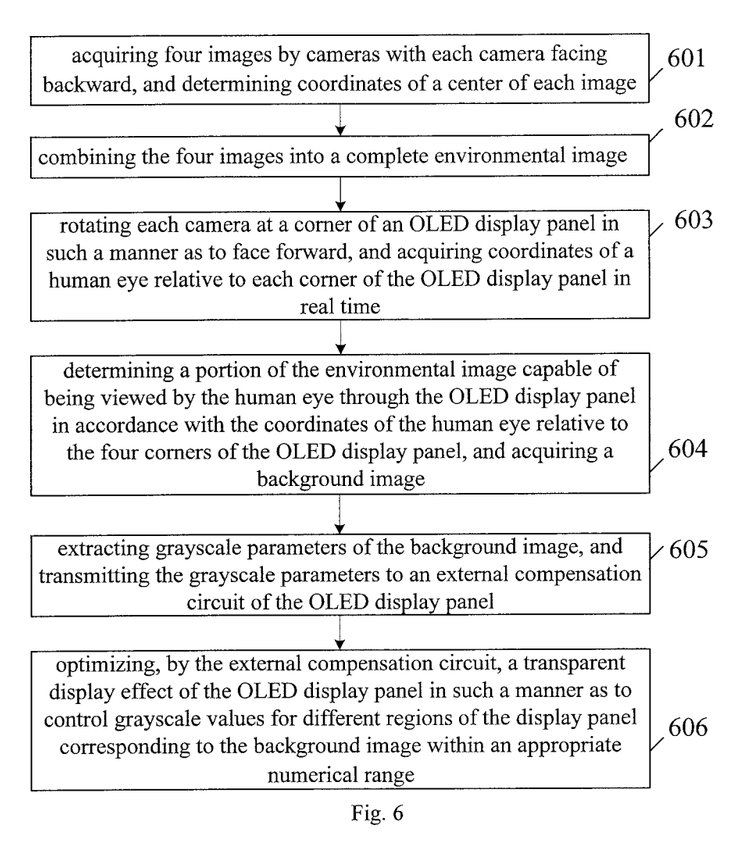
FIG. 6 is a flow chart of an image display method according to one embodiment of the present disclosure.

As shown in FIG. 5, the display panel 21 is an Organic Light-Emitting Diode (OLED) display panel, and the cameras 51 are arranged at the four corners of the display panel for acquiring the environmental image 41 behind the OLED display panel. At this time, as shown in FIG. 6, the image display method may include: Step 601 of acquiring the four images by the cameras with each camera facing backward, and determining center coordinates of each image (as shown in FIGS. 3A to 3D); Step 602 of combining the four images into the complete environmental image; Step 603 of rotating each camera at the corner of the OLED display panel in such a manner as to face forward, and acquiring coordinates of a human eye relative to each corner of the OLED display panel in real time; Step 604 of determining a portion of the environmental image (i.e., the background image) capable of being viewed by the human eye through the OLED display panel in accordance with the coordinates of the human eye relative to the four corners of the OLED display panel, and acquiring the background image; Step 605 of extracting the grayscale parameters of the background image, and transmitting the grayscale parameters to an external compensation circuit of the OLED display panel;

Step 606 of optimizing, by the external compensation circuit, a transparent display effect of the OLED display panel in such a manner as to increase a driving current for a region of the display panel corresponding to the background image where the grayscale value is relatively low and reduce a driving current for a region of the display panel corresponding to the background image where the grayscale value is relatively high, thereby to control grayscale values for different regions of the display panel corresponding to the background image within an appropriate numerical range.

The image display method has been described hereinabove. It should be appreciated that, the display panel is not limited to be of the rectangular shape, and the number of the predetermined collection positions is not limited to be four. Any technical scheme of acquiring the environmental image in the backlight direction of the display panel at the predetermined collection positions and determining from the environmental image the background image capable of being viewed by the user through the display panel based on the geometric principle shall also fall within the scope of the present disclosure.

Figure 7:
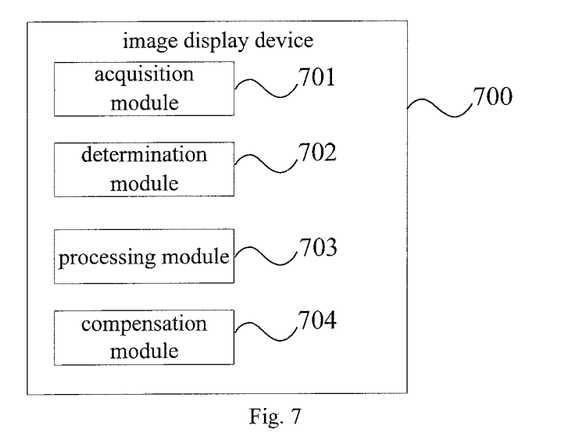
FIG. 7 is a schematic view showing a logic architecture of an image display device according to one embodiment of the present disclosure.

As shown in FIG. 7, the present disclosure further provides in some embodiments an image display device 700, which includes: an acquisition module 701 configured to acquire an environmental image in a backlight direction of the display panel; a determination module 702 configured to determine a viewing position of a user, and determine a background image capable of being viewed by the user through the display panel from the environmental image; a processing module 703 configured to determine an image compensation parameter of the display panel in accordance with an image parameter of the background image; and a compensation module 704 configured to control the display panel to compensate for a to-be-displayed image in accordance with the image compensation parameter.

According to the image display device in the embodiments of the present disclosure, the image to be displayed on the display panel is compensated in accordance with the image parameter of the background image to be displayed. As a result, it is able to optimize the display of the background image, prevent the background image from interfering with an original content to be viewed by the user, and display both the background and the original content at a display region in a clear manner, thereby to significantly improve the user experience as well as a transparent display effect.

The image display device will be described hereinafter in more details in conjunction with the embodiments.

The display panel may be of a rectangular shape, and four corners of the display panel may correspond to four predetermined collection positions respectively. The acquisition module 701 may include: four cameras arranged at the four predetermined collection positions respectively; a photographing control unit configured to photograph an environment in the backlight direction of the display panel through the four cameras, so as to acquire four images; and a combination unit configured to combine the four images into the environmental image.

Illustratively, the combination unit is further configured to: determine an upper left positioning point, a lower left positioning point, an upper right positioning point and a lower right positioning point; place the image acquired at a predetermined upper left collection position of the display panel in such a manner that a center of the image coincides with the upper left positioning point; place the image acquired at a predetermined lower left collection position of the display panel in such a manner that a center of the image coincides with the lower left positioning point; place the image acquired at a predetermined upper right collection position of the display panel in such a manner that a center of the image coincides with the upper right positioning point; place the image acquired at a predetermined lower right collection position of the display panel in such a manner that a center of the image coincides with the lower right positioning point; and combine the four images into the environmental image.

The determination module 702 may include: a determination unit configured to position the user at each predetermined collection position so as to generate coordinates (Si, Si') of the user relative to each corner of the display device, where i=1, 2, 3, 4; a calculation unit configured to determine coordinates $(X_i, Y_i)$ of each corner of the background image using the formulae $$Y_i = y_i - \frac{S_1 d_2}{d_1} \text{ and } X_i = x_i - \frac{S_1 d_2}{d_1};$$

and an acquisition unit configured to acquire the background image from the environmental image in accordance with the coordinates $(X_i, Y_i)$ of four corners of the background image, wherein $d_1$ represents a vertical distance between the user and the display panel, $d_2$ represents a vertical distance between the display panel and the environmental image, and $(x_i, y_i)$ represents coordinates of four corners of an orthogonal projection of the display panel onto the environmental image.

In addition, the processing module may be further configured to extract grayscale parameters of the background image; and determine driving current compensation parameters for different regions of the display panel in accordance with the grayscale parameters.

In addition, the compensation module may be further configured to compensate for the different regions of the display panel in accordance with the corresponding driving current compensation parameters, so as to increase a driving current for a region of the display panel corresponding to the background image where the grayscale parameter is smaller than a predetermined threshold, and/or reduce a driving current for a region of the display panel corresponding to the background image where the grayscale parameter is greater than the predetermined threshold.

Figure 8:
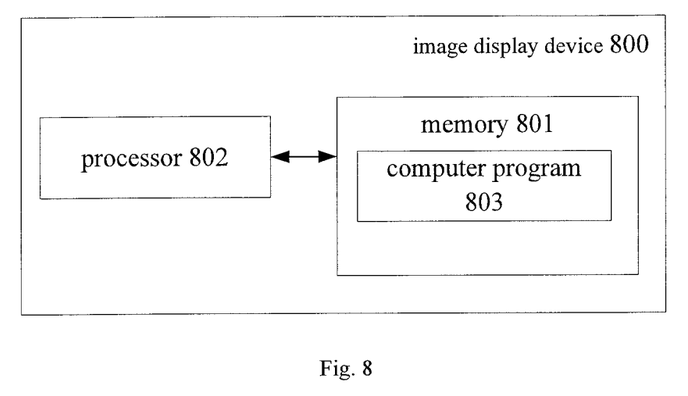
FIG. 8 is another schematic view showing a physical architecture of the image display device according to one embodiment of the present disclosure.

As shown in FIG. 8, the present disclosure further provides in some embodiments an image display device 800, which includes a memory 801, a processor 802 and a computer program 803 stored in the memory 801 and capable of being executed by the processor 802. The processor 802 is configured to execute the computer program 803 so as to implement the above image display method, including: acquiring an environmental image in a backlight direction of the display panel; determining a viewing position of a user, and determining a background image capable of being viewed by the user through the display panel from the environmental image; determining an image compensation parameter of the display panel in accordance with an image parameter of the background image; and controlling the display panel to compensate for a to-be-displayed image in accordance with the image compensation parameter.

The display panel may be of a rectangular shape, and four corners of the display panel may correspond to four predetermined collection positions respectively. The processor 802 may be further configured to execute the computer program 803, so as to acquire an environmental image in a backlight direction of the display panel, including: photographing an environment in the backlight direction of the display panel at the four predetermined collection positions, so as to acquire four images; and combining the four images into the environmental image.

Illustratively, the processor 802 may be further configured to execute the computer program 803 so as to combine the four images into the environmental image, including: determining an upper left positioning point, a lower left positioning point, an upper right positioning point and a lower right positioning point; placing the image acquired at a predetermined upper left collection position of the display panel in such a manner that a center of the image coincides with the upper left positioning point; placing the image acquired at a predetermined lower left collection position of the display panel in such a manner that a center of the image coincides with the lower left positioning point; placing the image acquired at a predetermined upper right collection position of the display panel in such a manner that a center of the image coincides with the upper right positioning point; placing the image acquired at a predetermined lower right collection position of the display panel in such a manner that a center of the image coincides with the lower right positioning point; and combining the four images into the environmental image.

The processor 802 may be further configured to execute the computer program 803, so as to determine a viewing position of a user, and determine a background image capable of being viewed by the user through the display panel from the environmental image: positioning the user at each predetermined collection position so as to generate coordinates (Si, Si') of the user relative to each of four corners of the display device, where i=1, 2, 3, 4; determining coordinates $(X_i, Y_i)$ of each of four corners of the background image using the formulae $$Y_i = y_i - \frac{S_1 d_2}{d_1} \text{ and } X_i = x_i - \frac{S_1 d_2}{d_1};$$

and acquiring the background image from the environmental image in accordance with the coordinates $(X_i, Y_i)$ of four corners of the background image, wherein $d_1$ represents a vertical distance between the user and the display panel, $d_2$ represents a vertical distance between the display panel and the environmental image, and $(x_i, y_i)$ represents coordinates of four corners of an orthogonal projection of the display panel onto the environmental image.

In addition, the processor 802 may be further configured to execute the computer program 803 so as to determine an image compensation parameter of the display panel in accordance with an image parameter of the background image, including: extracting grayscale parameters of the background image; and determining driving current compensation parameters for different regions of the display panel in accordance with the grayscale parameters.

In addition, the processor 802 may be further configured to execute the computer program 803, so as to compensate for the different regions of the display panel in accordance with the corresponding driving current compensation parameters, thereby to increase a driving current for a region of the display panel corresponding to the background image where the grayscale parameter is smaller than a predetermined threshold, and/or reduce a driving current for a region of the display panel corresponding to the background image where the grayscale parameter is greater than the predetermined threshold.

It should be appreciated that, the memory 801 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 801 intends to include, but not limited to, the above-mentioned and any other appropriate memories.

The present disclosure further provides in some embodiments a computer-readable storage medium storing therein a computer program. The computer program is executed by a processor so as to: acquire an environmental image in a backlight direction of the display panel; determine a viewing position of a user, and determine a background image capable of being viewed by the user through the display panel from the environmental image; determine an image compensation parameter of the display panel in accordance with an image parameter of the background image; and control the display panel to compensate for a to-be-displayed image in accordance with the image compensation parameter.

The display panel may be of a rectangular shape, and four corners of the display panel may correspond to four predetermined collection positions respectively. The computer program may be further executed by the processor, so as to: photograph an environment in the backlight direction of the display panel at the four predetermined collection positions, so as to acquire four images; and combine the four images into the environmental image.

Illustratively, the computer program may be further executed by the processor so as to: determine an upper left positioning point, a lower left positioning point, an upper right positioning point and a lower right positioning point; place the image acquired at a predetermined upper left collection position of the display panel in such a manner that a center of the image coincides with the upper left positioning point; place the image acquired at a predetermined lower left collection position of the display panel in such a manner that a center of the image coincides with the lower left positioning point; place the image acquired at a predetermined upper right collection position of the display panel in such a manner that a center of the image coincides with the upper right positioning point; place the image acquired at a predetermined lower right collection position of the display panel in such a manner that a center of the image coincides with the lower right positioning point; and combine the four images into the environmental image.

The computer program may be further executed by the processor so as to: position the user at each predetermined collection position so as to generate coordinates (Si, Si') of the user relative to each of four corners of the display device, where i=1, 2, 3, 4; determine coordinates $(X_i, Y_i)$ of each of four corners of the background image using the formulae and acquire the background $$Y_i = y_i - \frac{S_1 d_2}{d_1} \text{ and } X_i = x_i - \frac{S_1 d_2}{d_1};$$

image from the environmental image in accordance with the coordinates $(X_i, Y_i)$ of four corners of the background image, wherein $d_1$ represents a vertical distance between the user and the display panel, $d_2$ represents a vertical distance between the display panel and the environmental image, and $(x_i, y_i)$ represents coordinates of four corners of an orthogonal projection of the display panel onto the environmental image.

In addition, the computer program may be further executed by the processor so as to: extract grayscale parameters of the background image; and determine driving current compensation parameters for different regions of the display panel in accordance with the grayscale parameters.

In addition, the computer program may be further executed by the processor, so as to compensate for the different regions of the display panel in accordance with the corresponding driving current compensation parameters, thereby to increase a driving current for a region of the display panel corresponding to the background image where the grayscale parameter is smaller than a predetermined threshold, and/or reduce a driving current for a region of the display panel corresponding to the background image where the grayscale parameter is greater than the predetermined threshold.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An image display method for use in a display panel for transparent display, comprising:

acquiring, by cameras at four corners of the display panel, an environmental image in a backlight direction of the display panel;

determining a viewing position of a user, and determining a background image capable of being viewed by the user through the display panel from the environmental image;

determining an image compensation parameter of the display panel in accordance with an image parameter of the background image; and controlling the display panel to compensate for a to-be-displayed image in accordance with the image compensation parameter;

wherein the determining viewing position of the user and determining the background image capable of being viewed by the user through the display panel from the environmental image further comprises;

rotating the cameras at four corners of the display panel to make the cameras to face the user, to acquire coordinates of eyes of the user relative to each corner of the display panel;

acquiring a background image from the environmental image, based on the coordinates of the eyes of the user relative to each corner of the display panel, wherein the background image is a part of the environmental image which is shielded by the display panel relative to the eyes of the user.

2. The image display method according to claim 1, wherein the display panel is of a rectangular shape, and four corners of the display panel correspond to four predetermined collection positions respectively,
wherein the acquiring the environmental image in the backlight direction of the display panel comprises:
photographing an environment in the backlight direction of the display panel at the four predetermined collection positions so as to acquire four images; and
combining the four images into the environmental image.

3. The image display method according to claim 2, wherein the combining the four images into the environmental image comprises:
determining an upper left positioning point, a lower left positioning point, an upper right positioning point and a lower right positioning point;
placing the image acquired at a predetermined upper left collection position of the display panel in such a manner that a center of the image coincides with the upper left positioning point;
placing the image acquired at a predetermined lower left collection position of the display panel in such a manner that a center of the image coincides with the lower left positioning point;
placing the image acquired at a predetermined upper right collection position of the display panel in such a manner that a center of the image coincides with the upper right positioning point;
placing the image acquired at a predetermined lower right collection position of the display panel in such a manner that a center of the image coincides with the lower right positioning point; and
combining the four images into the environmental image.

4. The image display method according to claim 2, wherein the rotating the cameras at four corners of the display panel to make the cameras to face the user, to acquire the coordinates of the eyes of the user relative to each corner of the display panel, acquiring the background image from the environmental image, based on the coordinates of the eyes of the user relative to each corner of the display panel comprises:
positioning the user at each predetermined collection position so as to generate coordinates $(S_i, S_i')$ of the user relative to each of four corners of the display panel, where i=1, 2, 3, 4;
determining coordinates $(X_i, Y_i)$ of each of the four corners of the background image using formulae $$Y_i = y_i - \frac{S_1 d_2}{d_1} \text{ and } X_i = x_i - \frac{S_1 d_2}{d_1};$$

and
acquiring the background image from the environmental image in accordance with coordinates $(X_i, Y_i)$ of four corners of the background image,
wherein $d_1$ represents a vertical distance between the user and the display panel, $d_2$ represents a vertical distance between the display panel and the environmental image, and $(x_i, y_i)$ represents coordinates of four corners of an orthogonal projection of the display panel onto the environmental image.

5. The image display method according to claim 1, wherein the determining the image compensation parameter of the display panel in accordance with the image parameter of the background image comprises:
extracting grayscale parameters of the background image; and
determining driving current compensation parameters for different regions of the display panel in accordance with the grayscale parameters.

6. The image display method according to claim 5, wherein the controlling the display panel to compensate for the to-be-displayed image in accordance with the image compensation parameter comprises:
compensating for the different regions of the display panel in accordance with corresponding driving current compensation parameters, to increase a driving current for a region of the display panel corresponding to the background image where the grayscale parameter is smaller than a predetermined threshold, and/or reduce a driving current for a region of the display panel corresponding to the background image where the grayscale parameter is greater than the predetermined threshold.

7. An image display device, comprising a memory, a processor and a computer program stored in the memory and capable of being executed by the processor, wherein the processor is configured to execute the computer program so as to implement the image display method according to claim 1.

8. An image display device, comprising:
an acquisition module configured to acquire an environmental image in a backlight direction of a display panel;
a determination module configured to determine a viewing position of a user, and determine a background image capable of being viewed by the user through the display panel from the environmental image;
a processing module configured to determine an image compensation parameter of the display panel in accordance with an image parameter of the background image; and
a compensation module configured to control the display panel to compensate for a to-be-displayed image in accordance with the image compensation parameter;
wherein the acquisition module comprises cameras at four corners of the display panel;
the determination module is further configured to;
acquire coordinates of eyes of the user relative to each corner of the display panel, by rotating the cameras at four corners of the display panel to make the cameras to face the user;
acquire a background image from the environmental image, based on the coordinates of the eyes of the user relative to each corner of the display panel, wherein the background image is a part of the environmental image which is shielded by the display panel relative to the eyes of the user.

9. The image display device according to claim 8, wherein the display panel is of a rectangular shape, and four corners of the display panel correspond to four predetermined collection positions respectively,
a photographing control unit configured to photograph an environment in the backlight direction of the display panel through the four cameras, to acquire four images; and
a combination unit configured to combine the four images into the environmental image.

10. The image display device according to claim 9, wherein the combination unit is further configured to:

determine an upper left positioning point, a lower left positioning point, an upper right positioning point and a lower right positioning point;

place the image acquired at a predetermined upper left collection position of the display panel in such a manner that a center of the image coincides with the upper left positioning point;

place the image acquired at a predetermined lower left collection position of the display panel in such a manner that a center of the image coincides with the lower left positioning point;

place the image acquired at a predetermined upper right collection position of the display panel in such a manner that a center of the image coincides with the upper right positioning point;

place the image acquired at a predetermined lower right collection position of the display panel in such a manner that a center of the image coincides with the lower right positioning point; and combine the four images into the environmental image.

11. The image display device according to claim 8, wherein the determination module comprises:

a determination unit configured to position the user at each predetermined collection position so as to generate coordinates $(S_i, S_i')$ of the user relative to each of four corners of the display device, where i=1, 2, 3, 4;

a calculation unit configured to determine coordinates $(X_i, Y_i)$ of each of the four corners of the background image using formulae $$Y_i = y_i - \frac{S_1 d_2}{d_1} \text{ and } X_i = x_i - \frac{S_1 d_2}{d_1};$$

and an acquisition unit configured to acquire the background image from the environmental image in accordance with coordinates $(X_i, Y_i)$ of four corners of the background image, wherein $d_1$ represents a vertical distance between the user and the display panel, d2 represents a vertical distance between the display panel and the environmental image, and $(x_i, y_i)$ represents coordinates of four corners of an orthogonal projection of the display panel onto the environmental image.

12. The image display device according to claim 8, wherein the processing module is further configured to extract grayscale parameters of the background image, and determine driving current compensation parameters for different regions of the display panel in accordance with the gray scale parameters.

13. The image display device according to claim 8, wherein the compensation module is further configured to compensate for different regions of the display panel in accordance with corresponding driving current compensation parameters, to increase a driving current for a region of the display panel corresponding to the background image where a grayscale parameter is smaller than a predetermined threshold, and/or reduce a driving current for a region of the display panel corresponding to the background image where the grayscale parameter is greater than the predetermined threshold.

* * * * *